United States Patent Office 2,851,990
Patented Sept. 16, 1958

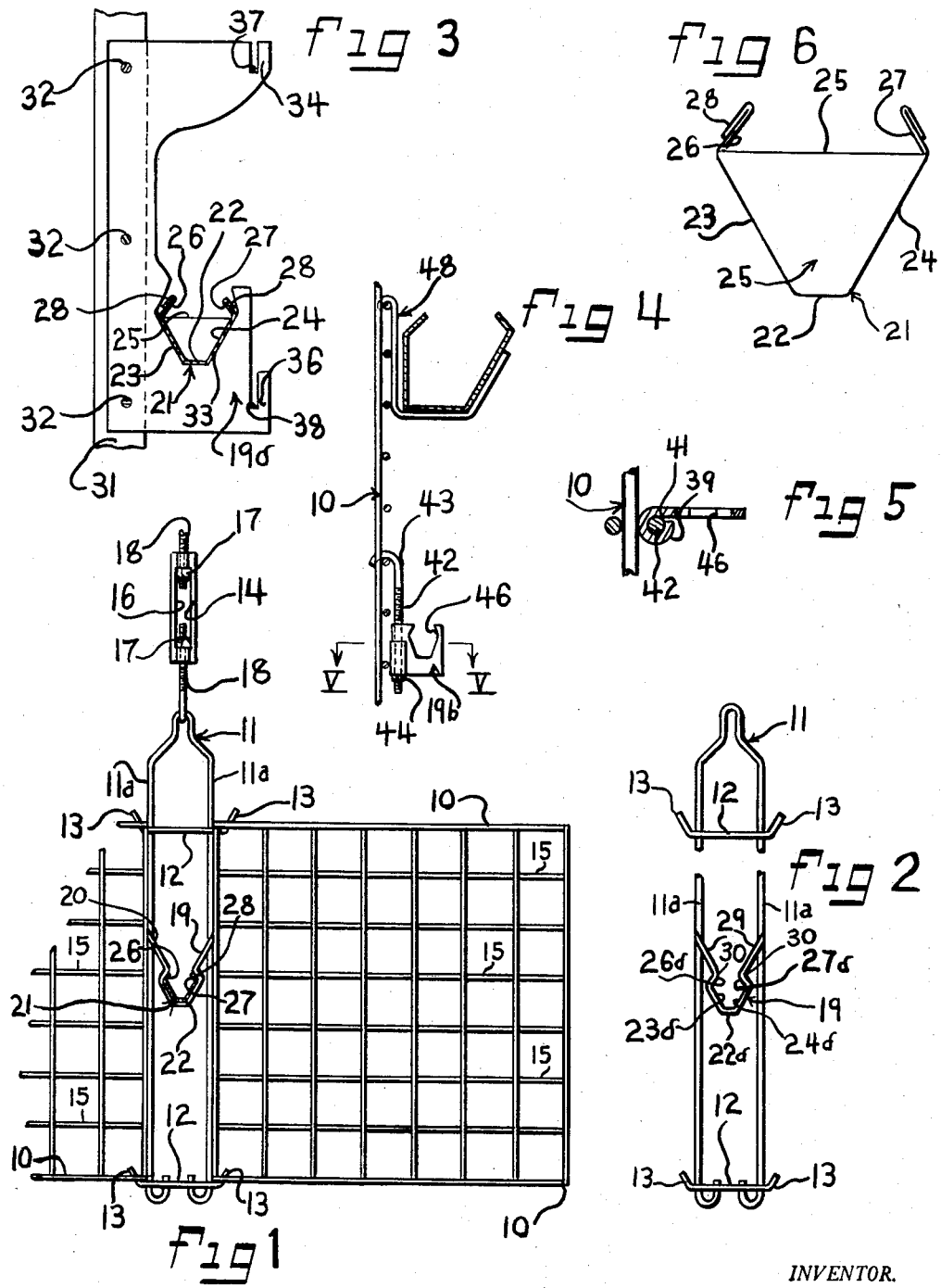

2,851,990

LAYING CAGE TROUGH AND SUPPORT THEREFOR

William H. Rowland, Jr., Decatur, Ala., assignor to Montgomery and Crawford Co., Inc., a corporation of Delaware Application August 30, 1955, Serial No. 531,320

3 Claims. (Cl. 119—18)

This invention relates to a poultry laying cage trough and support therefor and has for an object the provision of improved means for maintaining the trough properly aligned and level whereby when used as a water trough, water remains at a uniform level throughout the trough run.

Another object of my invention is to provide a trough and support therefor which may be constructed of light gauge metal and still have the required strength and rigidity.

Another object of my invention is to provide a trough and support therefor in which there is no direct contact between the trough and the zinc coating of a poultry laying cage, thereby eliminating galvanic action between the laying cage and a trough formed of a different material, such as stainless steel.

A specific object of my invention is to provide a water trough of the character designated which shall have an inwardly extending lip or flange at the top thereof which greatly facilitates the installation of the trough in its support and prevents spillage of the water from the trough due to the fact that the wattles of the hens cannot enter the trough.

A still further object of my invention is to provide a water trough and support therefor of the character designated which shall be simple of construction, economical of manufacture and which shall be easy to install and maintain in clean condition.

Briefly, my improved trough and support therefor comprises an elongated trough having outwardly and upwardly extending side walls formed integrally with a relatively flat bottom wall. The upper edges of the side walls terminate in upwardly and inwardly extending flanges with the free edges thereof spaced from each other. The trough is supported by bracket members which extend transversely beneath the trough and have internal contours which correspond substantially to the contour of the trough, as viewed in transverse cross section.

Apparatus illustrating features of my invention is shown in the accompanying drawing, forming a part of this application, in which:

Fig. 1 is an end elevational view drawn to a small scale showing the manner in which a trough is mounted between a pair of laying cages the trough being shown in section;

Fig. 2 is an elevational view, with parts broken away, showing the manner in which a trough support member is secured to a laying cage hanger;

Fig. 3 is an end elevational view, showing a modified form of support for the trough, the trough being shown in section;

Fig. 4 is an end elevational view showing a still further modified form of trough support, the trough being shown in section;

Fig. 5 is a sectional view taken along the line V—V of Fig. 4 and drawn to an enlarged scale; and, Fig. 6 is an end elevational view of the trough shown in Figs. 1-3 drawn to substantially actual size, the thickness of the sheet metal being enlarged for the sake of clarity.

Referring now to the drawing for a better understanding of my invention, I show a pair of laying cages indicated at 10 supported by a hanger 11 comprising spaced, parallel vertical members 11a extending between adjacent cages 10. The hanger is provided with transverse cage supporting members 12 extending between the vertical members 11a and having upturned ends 13 for engaging the horizontally extending wires 15 at the bottom and top of the cages 10. Each hanger 11 is supported by a suitable adjustable connector 14. The form of connector shown comprises a longitudinally extending rectangular member having an opening 16 therein for receiving nuts 17 which are in threaded engagement with the inner ends of I-bolts 18. Suitable openings are provided in the top and bottom of the connector 14 for passing the I-bolts 18, as shown.

Secured to the vertical legs of the hanger 11, by any suitable means, such as welding at 20, is a cadmium plated bracket 19 for supporting a trough 21, which may be the water trough for the laying cages. As shown in Figs. 1 and 6, the trough 21 is provided with a substantially flat bottom wall 22 which is formed integrally with a pair of outwardly and upwardly extending side walls 23 and 24. Suitable end walls 25 are provided at the ends of the trough. The upper portions of the side walls 23 and 24 are bent so as to form upwardly and inwardly extending flanges 26 and 27, respectively. Each of the flanges 26 and 27 is bent over on itself as at 28 to provide a reinforcing flange which extends the entire length of the trough 21. Preferably, the trough 21 is formed of a rustproof material, such as stainless steel.

As shown in Figs. 1 and 2, the bracket 19 is formed of wire bent to a shape corresponding substantially to the shape of the trough 21, as viewed in transverse cross section. That is, the internal contour of the bracket 19 is provided with a relatively flat bottom portion 22a, upwardly and outwardly extending side portions 23a and 24a integrally connected to the bottom portion 22a at opposite sides thereof, and upwardly and inwardly extending portions 26a and 27a integrally connected to the upper edges of side portions 23a and 24a respectively. The upper ends of the portions 26a and 27a are connected to the hanger 11 by outwardly and upwardly extending portions 29 secured at their upper ends to the vertical members 11a. While I show the bracket 19 as being connected to the hanger 11 by the upwardly and outwardly extending portions 29, it will be apparent that other means may be employed for securing the bracket to the hanger. Opposed, inwardly extending projections 30 are thus formed by the inwardly extending portions 26a and 27a and the integrally connected outwardly extending portions 29 and tend to hold the trough in position within the bracket 19.

From the foregoing description, the installation and operation of my improved trough and support therefor, as shown in Figs. 1 and 2, will readily be understood. The hangers 11 are attached to the connectors 14 and are adjusted whereby the trough will assume the proper level to provide for continuous flow of water at a uniform level throughout the trough run. With the brackets 19 thus adjusted to the proper elevation, the trough 21 is installed by placing the same on top of the brackets 19 and then forcing the same downwardly whereupon the sides 23 and 24 of the trough flex inwardly to permit the trough to snap in place, as shown in Fig. 1. Due to the fact that the stainless steel trough 21 is connected to the galvanized laying cages 10 by means of a cadmium plated bracket 19, there is no direct contact between the trough and the cages, thus eliminating galvanic action between the stainless steel trough and the zinc coated cages. The upwardly and inwardly extending flanges 26 and 27 prevent the trough from bowing or riding up in the brackets 19. Also, the inturned flanges provide for efficient cleaning of the trough by means of a brush of a shape corresponding to the internal contour of the trough. The flanges hold the brush down inside the trough, thus assuring that all sides of the trough are contacted by the brush as it is pulled therethrough. The inturned flanges 26 and 27 also prevent spillage of water by the hens as they drink from the trough due to the fact that their wattles cannot enter the trough.

In Fig. 3 of the drawing I show a modified form of trough supporting bracket at 19a. The bracket 19a is formed of a flat sheet of material, such as galvanized metal, and is secured to a suitable supporting structure, indicated generally at 31 by means of screws 32. The bracket 19a is cut away to provide a slot 33 therein having an internal contour which corresponds generally to the external contour of the trough 21, as viewed in transverse cross section. Outwardly extending portions 34 and 36 are provided at the top and bottom, respectively, of the bracket 19a for attaching a laying cage thereto. Suitable slots 37 and 38 are provided in the portions 34 and 36, respectively, for receiving the horizontal wires 15 of the laying cages, not shown. In all other respects, the installation and use of the bracket shown in Fig. 3 is the same as that shown in Figs. 1 and 2.

In Figs. 4 and 5 I show a still further modified form of bracket at 19b. This bracket is also in the form of a metal plate and is provided with a rolled edge 39 at one side thereof which defines a vertical passage 41 for receiving a threaded member 42 having a hook 43 at the upper end thereof for engaging a horizontal wire at the front of a laying cage 10, as shown. A nut 44 is in threaded engagement with member 42 and engages the lower end of the bracket 19b whereby the same is supported in selected positions. The bracket 19b is cut away to provide a slot 46 having an internal contour which corresponds substantially to the contour of the trough 21, as viewed in transverse section. The slot 46 receives the trough 21 in the same manner as the slot 33 whereby the same is supported along side the laying cage as shown. The bracket 19b may be employed to support the water trough on the front of the laying cages, while the feed trough may be mounted as shown generally at 48.

From the foregoing, it will be seen that I have devised an improved trough and support therefor which may be formed of relatively light gauge metal and still have the required rigidity and strength. By providing a trough and support therefor having substantially the same contour, the trough may be properly aligned and leveled. Also, after such alignment and leveling, the trough remains in this position due to the fact that it cannot bow or ride up in the supporting brackets. Furthermore, with a trough and support made in accordance with my invention, there is no contact between the trough and the back of the cages and there is no spreading of the trough. In actual practice, I have found that my improved trough and support therefor is satisfactory in every respect and is particularly adapted for mass production.

While I have shown my invention in several forms, it will be obvious to those skilled in the art that it is not so limited but is susceptible of various other changes and modifications without departing from the spirit thereof, and I desire, therefore, that only such limitations shall be placed thereupon as are specifically set forth in the appended claims.

What I claim is:

1. An integral support for a pair of adjacent poultry laying cages and for a watering trough disposed between the cages comprising a vertically suspended hanger having a pair of spaced, parallel vertical members extending between the adjacent cages with one of said vertical members disposed in contact relation to one cage and the other of said vertical members disposed in contact relation to the other of said cages, a horizontal member secured to said vertical members and extending outwardly therefrom for supporting the cages, an integral bracket extending between and secured to said vertical members and adapted for receiving a watering trough therein whereby poultry from both of said cages may drink therefrom, said bracket having a bottom portion and a pair of opposed, inwardly extending projections above the bottom portion whereby a watering trough may be positioned on said bottom portion and held in position by said inwardly extending projections.

2. An integral support for a pair of adjacent poultry laying cages and for a watering trough disposed between the cages comprising a vertically suspended hanger having a pair of spaced, parallel vertical members extending between the adjacent cages with one of said vertical members disposed in contact relation to one cage and the other of said vertical members disposed in contact relation to the other of said cages, a horizontal member secured to said vertical members and extending outwardly therefrom for supporting the cages, an integral bracket extending between said vertical members between the adjacent cages and adapted for receiving a watering trough therein whereby poultry from both of said cages may drink therefrom, said bracket comprising a flat horizontal bottom portion, first side portions integrally connected to opposite sides of the bottom portion and extending upwardly and outwardly therefrom, second side portions being integrally connected to the upper edges of said first side portions and extending inwardly and upwardly therefrom, and additional side portions integrally connected to the upper edges of said second side portions and secured to said vertical members, said second side portions forming inwardly extending projections whereby a watering trough may be positioned on said bottom portion and held in position by said inwardly extending projections.

3. A support for a poultry watering trough disposed between two adjacent laying cages comprising a pair of spaced, parallel vertical members extending between the adjacent cages with one of said vertical members disposed in contact relation to one cage and the other of said vertical members disposed in contacting relation to the other of said cages, an integral bracket extending between said vertical members between the adjacent cages and adapted for receiving a watering trough therein whereby poultry from both of the cages may drink therefrom, said bracket comprising a flat horizontal bottom portion, first side portions integrally connected to opposite sides of the bottom portion and extending upwardly and outwardly therefrom, second side portions being integrally connected to the upper edges of said first side portions and extending inwardy and upwardly therefrom, and additional side portions integrally connected to the upper edges of said second side portions and secured to said vertical members, said second side portions forming inwardly extending projections whereby a watering trough may be positioned on said bottom portion and held in position by said inwardly extending projections.

References Cited in the file of this patent

UNITED STATES PATENTS

| | | |
|---|---|---|
| 1,771,647 | Moe | July 29, 1930 |
| 1,812,684 | Carpenter | June 30, 1931 |
| 1,881,023 | Hoeft | Oct. 4, 1932 |
| 1,989,025 | Pronske et al. | Jan. 22, 1935 |
| 2,619,313 | Whittington | Nov. 25, 1952 |
| 2,636,475 | Moyer | Apr. 28, 1953 |

FOREIGN PATENTS

| | | |
|---|---|---|
| 445,449 | Great Britain | Apr. 9, 1936 |